United States Patent [19]

Ayers, Jr. et al.

[11] Patent Number: 4,524,796

[45] Date of Patent: Jun. 25, 1985

[54] SLIDING-GATE VALVE FOR USE WITH ABRASIVE MATERIALS

[75] Inventors: William J. Ayers, Jr., Morgantown; Charles R. Carter, Fairmont; Richard A. Griffith, Morgantown; Richard B. Loomis, Bruceton Mills; John E. Notestein, Morgantown, all of W. Va.

[73] Assignee: The United States of America as represented by the United States Department of Energy, Washington, D.C.

[21] Appl. No.: 422,795

[22] Filed: Sep. 24, 1982

[51] Int. Cl.³ .......................... F16K 3/36; F16K 25/00
[52] U.S. Cl. .................................. 137/240; 137/613; 251/159; 251/187; 251/195; 251/204
[58] Field of Search .............. 251/195, 159, 170, 187, 251/203, 204; 137/613, 240

[56] References Cited

U.S. PATENT DOCUMENTS

| | | | |
|---|---|---|---|
| 2,231,614 | 2/1941 | Burke | 251/187 |
| 3,068,888 | 12/1962 | Mohr, Jr. | 251/204 |
| 3,352,535 | 11/1967 | Power | 251/204 |
| 3,547,140 | 12/1970 | Hastings et al. | 251/159 |
| 3,557,822 | 1/1971 | Chronister | 251/159 |
| 3,741,522 | 6/1971 | Frohlich | 251/170 |
| 4,292,992 | 10/1981 | Bhidé | 137/613 |
| 4,294,284 | 10/1981 | Herd | 137/613 |
| 4,338,960 | 7/1982 | Ashdown | 137/240 |
| 4,402,337 | 9/1983 | Schuurman | 251/195 |

Primary Examiner—A. Michael Chambers
Attorney, Agent, or Firm—Earl L. Larcher; Stephen D. Hamel; Judson R. Hightower

[57] ABSTRACT

The invention is a flow and pressure-sealing valve for use with abrasive solids. The valve embodies special features which provide for long, reliable operating lifetimes in solids-handling service. The valve includes upper and lower transversely slidable gates, contained in separate chambers. The upper gate provides a solids-flow control function, whereas the lower gate provides a pressure-sealing function. The lower gate is supported by means for (a) lifting that gate into sealing engagement with its seat when the gate is in its open and closed positions and (b) lowering the gate out of contact with its seat to permit abrasion-free transit of the gate between its open and closed positions. When closed, the upper gate isolates the lower gate from the solids. Because of this shielding action, the sealing surface of the lower gate is not exposed to solids during transit or when it is being lifted or lowered. The chamber containing the lower gate normally is pressurized slightly, and a sweep gas is directed inwardly across the lower-gate sealing surface during the vertical translation of the gate.

2 Claims, 2 Drawing Figures

U.S. Patent    Jun. 25, 1985    4,524,796
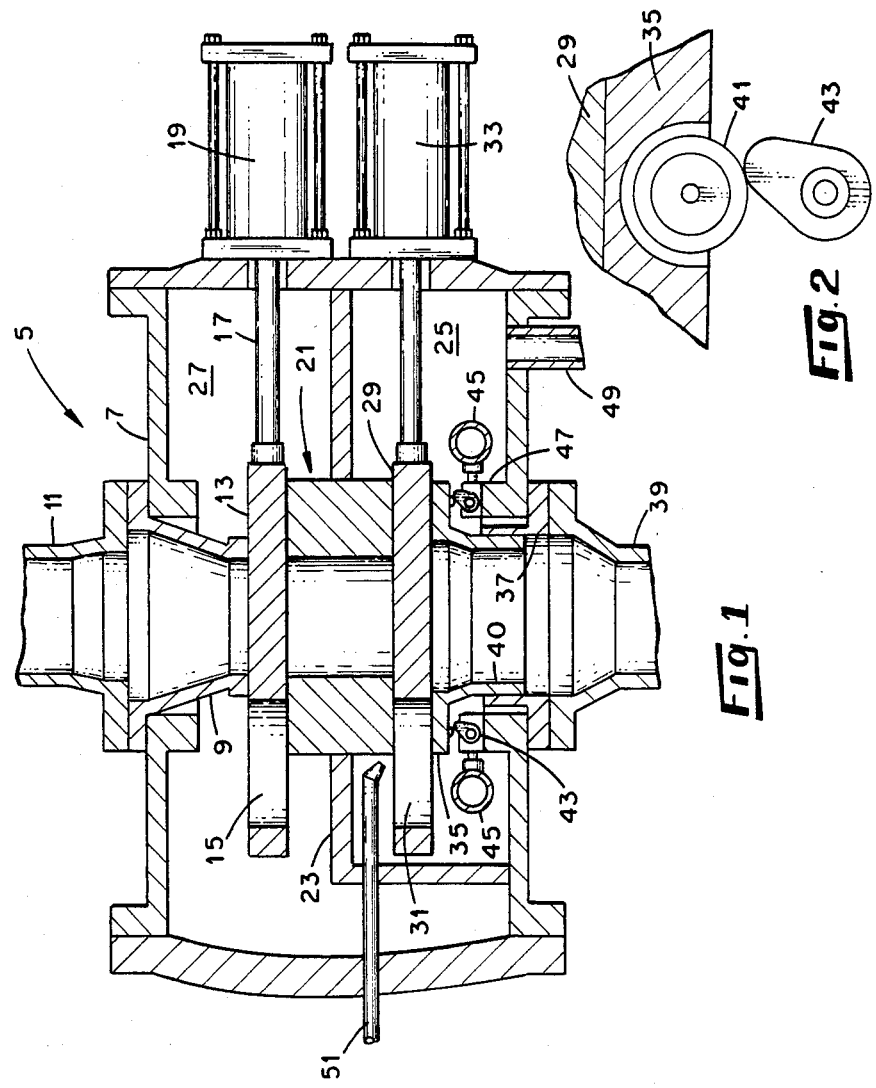

SLIDING-GATE VALVE FOR USE WITH ABRASIVE MATERIALS

BACKGROUND OF THE INVENTION

This invention relates generally to sliding-gate valves and more particularly to improvements therein facilitating use with highly abrasive solids.

This invention was developed in response to a need for a reliable and long-lived block valve for controlling the flow of abrasive solids—e.g., coal ash—through a vertically disposed outlet line connected to a hopper. The design requirements for the desired valve specified that it should operate for long periods without jamming resulting from buildup of particulates and with only minimal abrasion of its sealing surfaces. Conventional valves were found to be deficient with respect to either or both of these requirements.

Conventional sliding-gate valves for use with abrasive solids include the valve described in U.S. Pat. No. 3,918,471, issued to M. P. Bedner on Nov. 11, 1975. That valve includes a slidable gate which is mounted for reciprocation in a leaktight valve body; the body is pressurized with a purge gas. Another sliding-gate valve for use with abrasive solids is disclosed in U.S. Pat. No. 4,174,728 issued to G. B. Usnick et al on Nov. 20, 1979. That valve includes a reciprocatable gate whose sealing surfaces are shielded by the valve seats when the gate is in its fully open and fully closed position. The gate-to-seat clearances are swept by an inflowing purge gas while the gate is in transit.

The known art also includes a metering valve for receiving powder from a hopper and intermittently dispensing a fixed volume of the same. The metering valve includes an upper disc having a marginal portion thereof fitted between the top and center seats. The disc is rotatable between positions where an aperture in its margin is either in register with and out of register with the seats. A similarly rotatable lower disc is fitted between the center and bottom seats. With the lower disc in closed position and the upper disc in open position, powder accumulates in the volume defined by the discs and seats. The upper disc then is rotated closed to isolate the valve from the hopper, following which the lower disc is rotated open to dispense the trapped volume of powder. The discs are at all times in contact with their respective stationary seats.

SUMMARY OF THE INVENTION

It is an object of this invention to provide a sliding-gate valve of novel design.

It is another object to provide a sliding-gate valve for use with particulate or fragmented solids, the valve being characterized by minimal buildup of solids on its sealing surfaces and elsewhere within the valve body.

It is another object to provide a sliding-gate valve characterized by minimal abrasion and erosion of its sealing surfaces.

Other objects and advantages of the invention will be made apparent hereinafter.

In one aspect, the invention is a valve assembly which includes a valve body having an upper inlet, a lower outlet, and a fixed annular seat mounted therebetween, all in register to define a vertical flow channel. An upper gate is provided for the channel and is slidably fitted between confronting surfaces of the inlet and the seat. The gate is an apertured plate which is mounted for transverse movement between operating positions where its aperture is respectively in and out of register with the flow channel. A vertically translatable, tubular lower-gate support member is mounted below and spaced from the seat. A lower gate for the channel is supported by the gate-support member and normally is fitted between confronting surfaces of the seat and the gate-support member. The lower gate is transversely movable between operating positions where its aperture is respectively in and out of register with the flow channel. Means are provided for vertically translating the gate-support member between an elevated position where it presses the lower gate into sealing engagement with the seat and a lower position where that gate is out of contact with the seat.

DESCRIPTION OF THE DRAWINGS

FIG. 1 is a longitudinal, central sectional view of a sliding-gate valve designed in accordance with the invention, and FIG. 2 is a detail view, partly in section, of a typical cam-and-roller arrangement of the kind shown in FIG. 1.

DETAILED DESCRIPTION OF THE INVENTION

FIG. 1 illustrates a preferred embodiment of the valve assembly in its closed position. For convenience, the valve assembly will be described as used to convey particulate abrasive material, such as coal ash or limestone. Referring to FIG. 1, the assembly 5 includes a horizontally elongated, leaktight valve body 7. The top of the valve body is formed with a downwardly extending conical tubular inlet 9. The upper end of the inlet is flanged for connection to the valve body and to a vertically disposed line 11 for conveying particulate material from a hopper (not shown). The lower end of the inlet is in contact with the upper face of a horizontally slidable gate 13 having a port 15 in an end thereof. The opposite end of the gate is coupled to the shaft 17 of a standard hydraulic cylinder 19 for reciprocating the gate between stationary positions, where its aperture is out of register with the inlet (as shown) or in register with the same. The cylinder 19 is sealably mounted to the outside of the valve body.

As shown, the upper gate 13 is supported by a stationary annular seat 21, which is in register with the inlet 9 and is supported by an impervious partition 23. The partition divides the body 7 into a lower chamber 25 and an upper chamber 27 which contains the upper gate 13. The lower chamber 25 contains a lower slidable gate 29 having a port 31. This gate is reciprocated between its open and closed positions by a second hydraulic cylinder 33, which is sealed to the body 7.

As shown, the bottom portion of the valve body includes a tubular outlet 37, which is flanged for connection to the body and to a materials-withdrawal line 39. In accordance with the invention, a vertically translatable support 40 is provided for the lower gate 29. The support is a tubular member whose lower end is slidably fitted in the outlet 37 and whose upper end is formed as an annular flange 35, on which the lower gate rests. As shown in more detail in FIG. 2, the lower face of the flange 35 carries spaced rollers 41, which rest respectively on eccentric cams 43. Standard air-operated double-acting hydraulic jacks 45 are respectively coupled to the cams to rotate them through an arc simultaneously. When moved upward, the cams lift the support member 40, raising the lower gate 29 to a position where it sealably engages the seat 21. When moved downward, the cams lower the support 40, moving gate 29 to a position where it is spaced from the seat. The cams and their jacks are supported by an annular portion 47 of the valve body.

As indicated in FIG. 1, the inlet 9, seat 21, support member 40, and outlet 39 define a vertical flow channel which can be opened and closed by means of the gates 13 and 29 (As will be described, the function of gate 29 is to provide pressure sealing). Both gates are designed to operate with close clearances preventing or minimizing the migration of particulate material into either the upper chamber 27 or the lower chamber 25. In accordance with the invention, the upper gate can be closed to isolate the seat 21 and the lower gate from the material. As will be described, when the lower gate is in either of its stationary positions, the cams 43 are operated to press it firmly against the lower face of seat 21 to form a pressure seal therewith. An additional pressure sealing force acts on gate 29 in its closed position; this is a result of a pressure difference across gate 29 due to a pressure gradient between chamber 25 (at a relatively high pressure) and chamber 27 (at a lower pressure). Before the lower gate 29 is moved between its open and closed positions, the various cams are operated to lower the gate so that it is out of contact with the seat 21 during transit.

The valve assembly shown in FIG. 1 is provided with a suitable supply of non-reactive gas (e.g., air) for (a) powering the above-mentioned hydraulic cylinders and jacks, (b) purging selected seating surfaces, and (c) pressurizing one or more chambers of the valve body. In the illustrated embodiment, a line 49 is provided to admit air to chamber 25 and maintain it at a pressure slightly exceeding the pressures prevailing outside the valve body and in the flow channel of the valve. Preferably, various nozzles (represented by 51) are mounted within the valve to direct air against selected sealing surfaces in order to sweep any solids thereon into the flow channel. For example, nozzles may be provided to direct air inwardly across mating surfaces of seat 21 and gate 29 when the surfaces are opening and closing.

The desired sequence of operations for the valve assembly is provided by a conventional electrical control circuit including relays and solenoid valves. The following is a summary of a preferred sequence of operations.

A. Cycle to Open (both gates closed initially; gate 29 shielded from solids)

1. The hydraulic jacks 45 are actuated to lower the outlet-and lower-gate assembly, moving the sealing surface of gate 29 out of contact with the sealing surface of seat 21.

2. Hydraulic cylinder 33 is actuated to translate the lower gate 29 to its open position.

3. The purge system is activated to admit purge gas to chamber 25 and sweep the sealing surfaces; the hydraulic jacks 45 are actuated to press the upper surface of gate 29 into sealing contact with the lower face of seat 21.

4. Hydraulic cylinder 19 is actuated to translate upper gate 13 to its open position, initiating ash flow through the assembly.

B. Cycle to Close (both gates initially open)

1. Hydraulic cylinder 19 is actuated to translate upper gate 13 to its closed position.

2. With the purge system on, the hydraulic jacks 45 are actuated to drop gate 29 out of contact with the seat 21.

3. Hydraulic cylinder 33 is actuated to translate the lower gate 29 to its closed position.

4. The hydraulic jacks 45 are actuated to raise gate 29 and press it firmly against seat 21. The purge system is deactivated.

The invention is designed to provide significant advantages for the handling of abrasive materials—e.g., ash, limestone, fragmented or pulverized coal, etc.—which tend to build up in valve cavities and erode sealing surfaces. The provision of individually operated upper and lower gates permits the solids-sealing and pressure-sealing functions to be separated. That is, the upper gate shuts off the solids flow, with the result that the lower gate can be opened and closed without being exposed to substantial quantities of particulates. When the lower gate is in its open or closed positions, its sealing surfaces are shielded from the flow of abrasive particles. The provision of a vertically translatable lower gate eliminates sliding contact between the surfaces forming the pressure seal; in addition, it permits purging of these surfaces each time that the pressure seal is opened or closed. The valve design is characterized by relatively small critical-tolerance areas and thus minimizes thermal-expansion considerations.

The foregoing illustration of the invention is provided for the purpose of illustration, not limitation. The illustrated embodiment was selected to best explain the principles of the invention and to enable others skilled in the art to make various embodiments and modifications best suited to a particular application. It will be apparent that various means may be utilized to effect vertical translation of the lower gate 29. For instance, an inflatable ring might be used as the means for raising and lowering the gate 29, thus eliminating the cams, jacks, and rollers described. In a variation of the illustrated embodiment, the flange may be affixed to a vertically translatable tube which is slidably fitted about portion 47 of the valve body. In still another arrangement, the flange 35 may rest on a plurality of spaced helical springs which normally urge the flange upward, causing gate 29 to sealably engage seat 21. Any suitable selectively actuatable means may be provided to displace the gate and flange downward against spring pressure in order to provide a clearance between seat 21 and gate 29 during horizontal travel of the latter. The displacement means may comprise pneumatic cylinders, each of which applies force to the upper face of the gate 29 via a ball or roller.

It is intended that the scope of the invention be defined by the appended claims.

What is claimed is:

1. A valve assembly for controlling the flow of abrasive, particulate material comprising:
   a valve body;
   partition means in said body for dividing said body into first and second compartments;
   a tubular inlet extending into said first compartment;
   a stationary annular seat disposed in the partition means for placing the first and second compartments in registry with one another, said annular seat being spaced from said tubular inlet;
   a displaceable tubular support member disposed in said second compartment and spaced from said annular inlet;

said tubular inlet, annular seat and tubular support member cooperatively defining a flow channel through said valve body;

a first gate in said first compartment comprising an apertured plate disposed in the space between confronting surfaces of said tubular inlet and said annular seat, said gate being mounted in said first compartment for transverse movement between first and second positions where the aperture in said apertured plate is respectively in and out of registry with said channel;

a second gate in said second compartment comprising a further apertured plate disposed in the space between confronting surfaces of said annular seat and said support member and supported by the latter for displacement therewith and mounted for movement transverse to said displacement between first and second positions where the aperture in said further apertured plate is respectively in and out of registry with said channel; and drive means for displacing said annular support member and said further apertured plate into a first position to sealably engage said further apertured plate with said annular seat when the aperture in the further apertured plate is either in or out of registry with said channel and for displacing said annular support member into a second position during the displacement of said second apertured plate into either of said positions where the aperture in said further apertured plate is either in or out of registry with said channel.

2. The valve assembly claimed in claim 1 including means for admitting a stream of a nonreactive purge gas into said second compartment at a sufficient volume for displacing particulate material from surfaces of said further apertured plate and from said tubular support member into said channel and for maintaining said gas at a pressure exceeding the pressure prevailing in said flow channel to inhibit flow of particulate material from said flow channel into said second compartment.

* * * * *